US012683370B2

(12) United States Patent
Michael

(10) Patent No.: US 12,683,370 B2
(45) Date of Patent: Jul. 14, 2026

(54) CABLE TRANSITION SYSTEMS

(71) Applicant: SHOALS TECHNOLOGIES GROUP, LLC, Portland, TN (US)

(72) Inventor: Dorothy Michael, Greenbrier, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 0 days.

(21) Appl. No.: 18/674,123

(22) Filed: May 24, 2024

(65) Prior Publication Data

US 2024/0396313 A1 Nov. 28, 2024

Related U.S. Application Data

(60) Provisional application No. 63/504,387, filed on May 25, 2023.

(51) Int. Cl.
*F16L 1/11* (2006.01)
*H02G 3/06* (2006.01)
*H02G 3/34* (2006.01)

(52) U.S. Cl.
CPC ............. *H02G 3/0608* (2013.01); *H02G 3/34* (2013.01)

(58) Field of Classification Search
CPC ......... H02G 3/0608; H02G 3/34; H02G 9/025
See application file for complete search history.

(56) References Cited

U.S. PATENT DOCUMENTS

| | | | |
|---|---|---|---|
| 8,183,461 B2 | 5/2012 | Ewer | |
| 12,410,873 B2 * | 9/2025 | Turner | F16L 1/11 |
| 2009/0084910 A1 * | 4/2009 | White | H02G 3/0608 |
| | | | 248/70 |

FOREIGN PATENT DOCUMENTS

| | | |
|---|---|---|
| DE | 8810744 U1 | 10/1988 |
| JP | H0237514 U | 3/1990 |

OTHER PUBLICATIONS

International Search Report and Written Opinion mailed Sep. 20, 2024, in PCT Application No. PCT/US2024/030985, 12 pgs.

* cited by examiner

*Primary Examiner* — Amy J. Sterling
(74) *Attorney, Agent, or Firm* — Panitch Schwarze Belsiario & Nadel LLP

(57) ABSTRACT

A cable transition system may include a first segment and a second segment. The first segment may at least partially define a first volume extending along a first plane and configured to receive a cable. The second segment may at least partially define a second volume extending along a second plane and configured to receive the cable. The second plane may be different than the first plane. The second segment may be configured to couple to the first segment to at least partially define an adjustable volume connected to the first volume and the second volume. The adjustable volume may be configured to route the cable between the first plane and the second plane.

20 Claims, 17 Drawing Sheets

CABLE TRANSITION SYSTEMS

CROSS-REFERENCE TO RELATED APPLICATION

This patent application claims the benefit of and priority to U.S. Provisional App. No. 63/504,387 filed May 25, 2023, titled "CABLE TRANSITION SYSTEMS," which is incorporated in the present disclosure by reference in its entirety.

FIELD

The embodiments discussed in the present disclosure are related to cable transition systems.

BACKGROUND

Unless otherwise indicated in the present disclosure, the materials described in the present disclosure are not prior art to the claims in the present application and are not admitted to be prior art by inclusion in this section.

A power system may include components that transfer power between each other via cables. A large portion of costs to deploy the power system may be associated with temporal aspects of creating an infrastructure for the power system. For example, to deploy the power system, trenches may be dug to route the cables beneath a ground surface, which may increase the costs due to the use of power equipment and time spent digging the trenches. Alternatively, to deploy the power system and route the cables above the ground surface, installation surfaces (e.g., different parts of the ground surface) may be graded to remove transitions between different installation surfaces to form a generally smooth surface. Grading the installation surfaces may increase the costs due to use of power equipment and time spent grading the installation surfaces. In addition, some transitions between different installation surfaces may not be able to be removed. For example, a transition including a curb between a road surface and a sidewalk surface may not be able to be removed. Thus, grading the installation surfaces may not always be possible and thus routing the cables above ground may limit the locations at which the power system may be deployed or may limit the size of the power system.

Accordingly, there is a need for a power system that manage and routes cables in a manner that reduces the deployment costs, does not limit the location at which the power system may be deployed, or does not limit the size of the power system.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments of the present disclosure address the problems with deploying a power system on installation surfaces that include a transition between different installation surfaces. Disclosed embodiments include a cable transition system (CTS) that couples to a cable management system (CMS) to create a contiguous volume along the installation surfaces and over the transition. The cables may be routed through the volumes of the CMS and the CTS (e.g., the contiguous volume) along the installation surfaces and over the transition. In addition, the CTS may couple to the CMS and may interface with the transition such that the cables are protected from external loads and/or exposure factors. For example, the CTS and/or the CMS may protect the cables from vehicular traffic, pedestrian traffic, other traffic, external loads, tampering, or other exposure factors.

The CTS may include segments that are adjustable to change (e.g., increase or decrease) a portion of the volume of the CTS (e.g., an adjustable volume). In addition, the segments of the CTS may be adjustable to permit the CTS to interface with transitions of different heights, sizes, or positions.

Therefore, the CTS and the CMS may eliminate the need for digging trenches and/or grading the installation surfaces without limiting the locations at which the power system may be deployed or limiting the size of the power system. In addition, the CTS may interface with transitions of different types, heights, sizes, or distances from the first segment to permit the CTS and the CMS to be implemented in a variety of environments.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
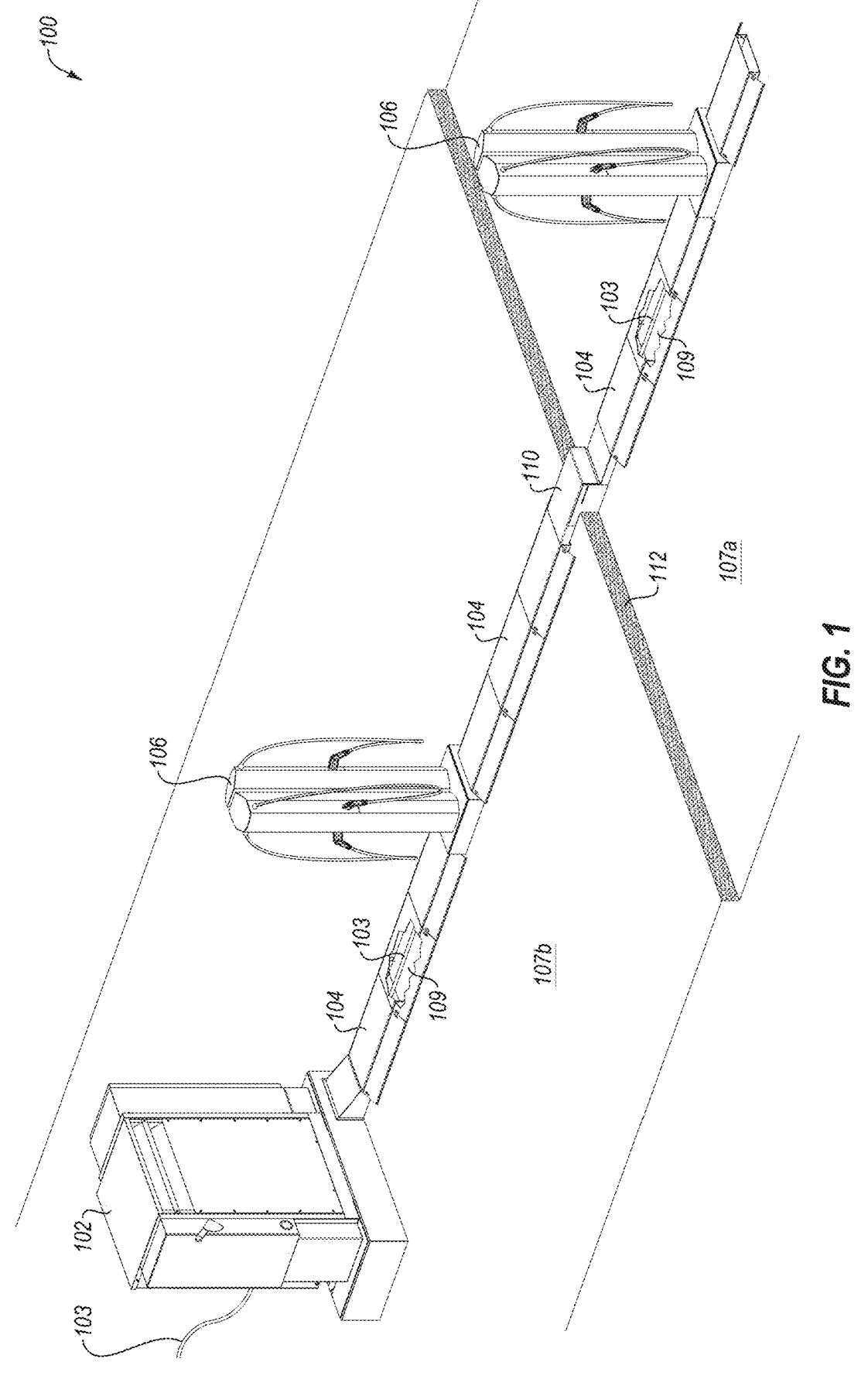
FIG. 1 illustrates an example electric vehicle (EV) charger system installed at a location that includes a transition between the installation surfaces.

FIG. 1 illustrates an example EV charger system 100 (hereinafter system 100) that includes a power platform 102, a CMS 104, cables 103 and one or more charger platforms 106. Single instances of the cables 103 are illustrated as extending between the components of the system 100 in FIG. 1 for ease of description and illustration. The power platform 102 may receive power from one or more power sources (not illustrated in FIG. 1) via the cable 103, which the power platform 102 regulates and transmits to the charger platforms 106 also via the cable 103. In this manner, the cable 103 may provide power from the power source to the power platform 102 and between the power platform 102 and the charger platforms 106.

The charger platforms 106, as illustrated in FIG. 1, include EV chargers to provide power to and charge EV batteries (not illustrated). The charger platforms 106 may include other configurations such as platforms to provide power to operate an external device, a charger to provide power to and charge batteries in other devices, or any other appropriate charger or platform.

As shown in FIG. 1, the charger platform 106 farthest from the power platform 102 is installed on a first installation surface 107a and the power platform 102 and the charger platform 106 are installed on a second installation surface 107b. The CMS 104 may extend between components of the system 100 on the corresponding installation surfaces 107a-b. For example, the CMS 104 may extend between the power platform 102 and the charger platform 106 on the second installation surface 107b, between the charger platform 106 and a portion of a CTS 110 also on the second installation surface 107b, and between the charger platform 106 and another portion of the CTS 110 on the first installation surface 107a.

Figure 2A:
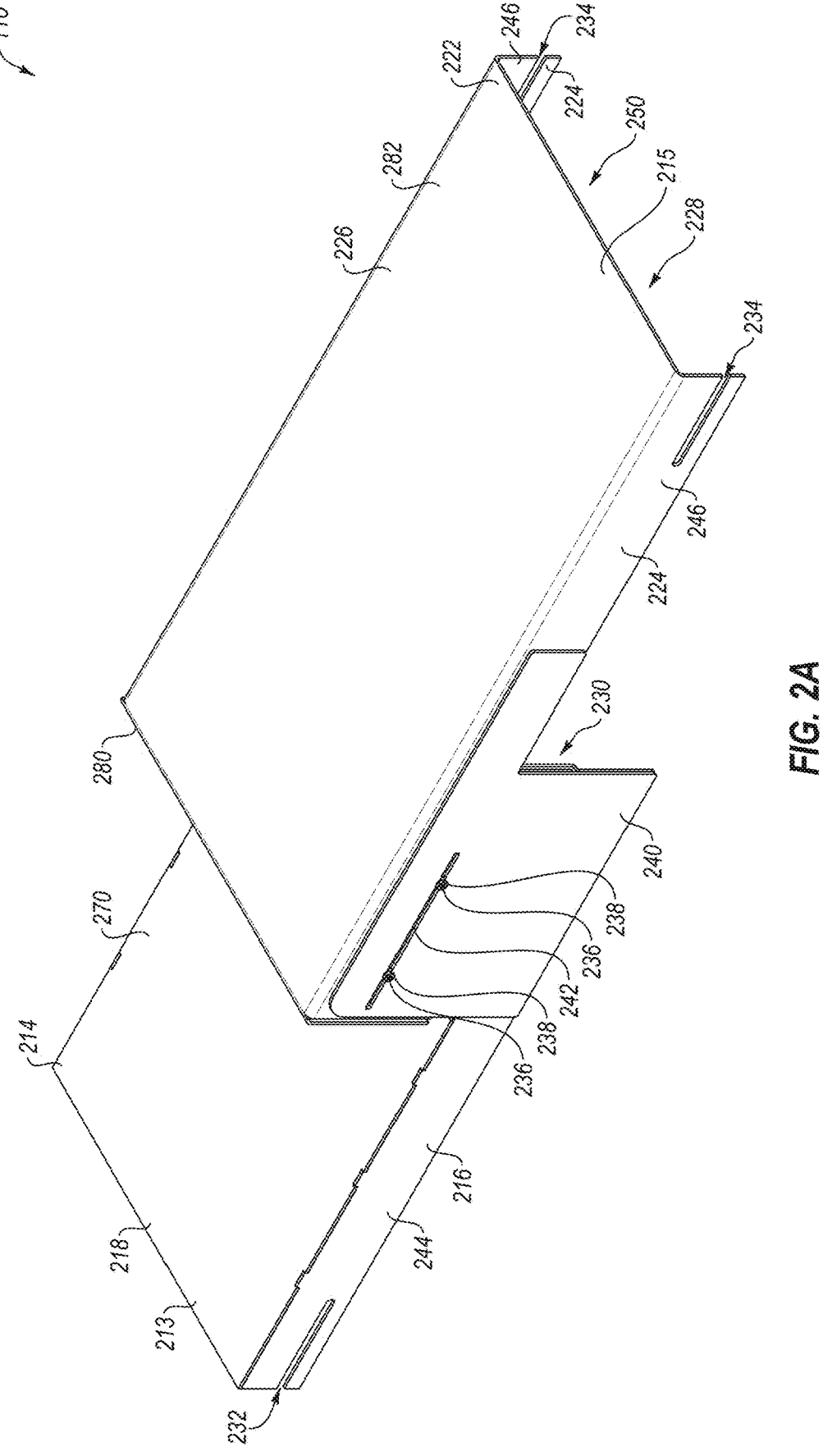
FIGS. 2A-2F illustrate a left perspective view, a right perspective view, a top view, a bottom view, a front view, and a back view of an example of the CTS of FIG. 1.
Figure 2B:
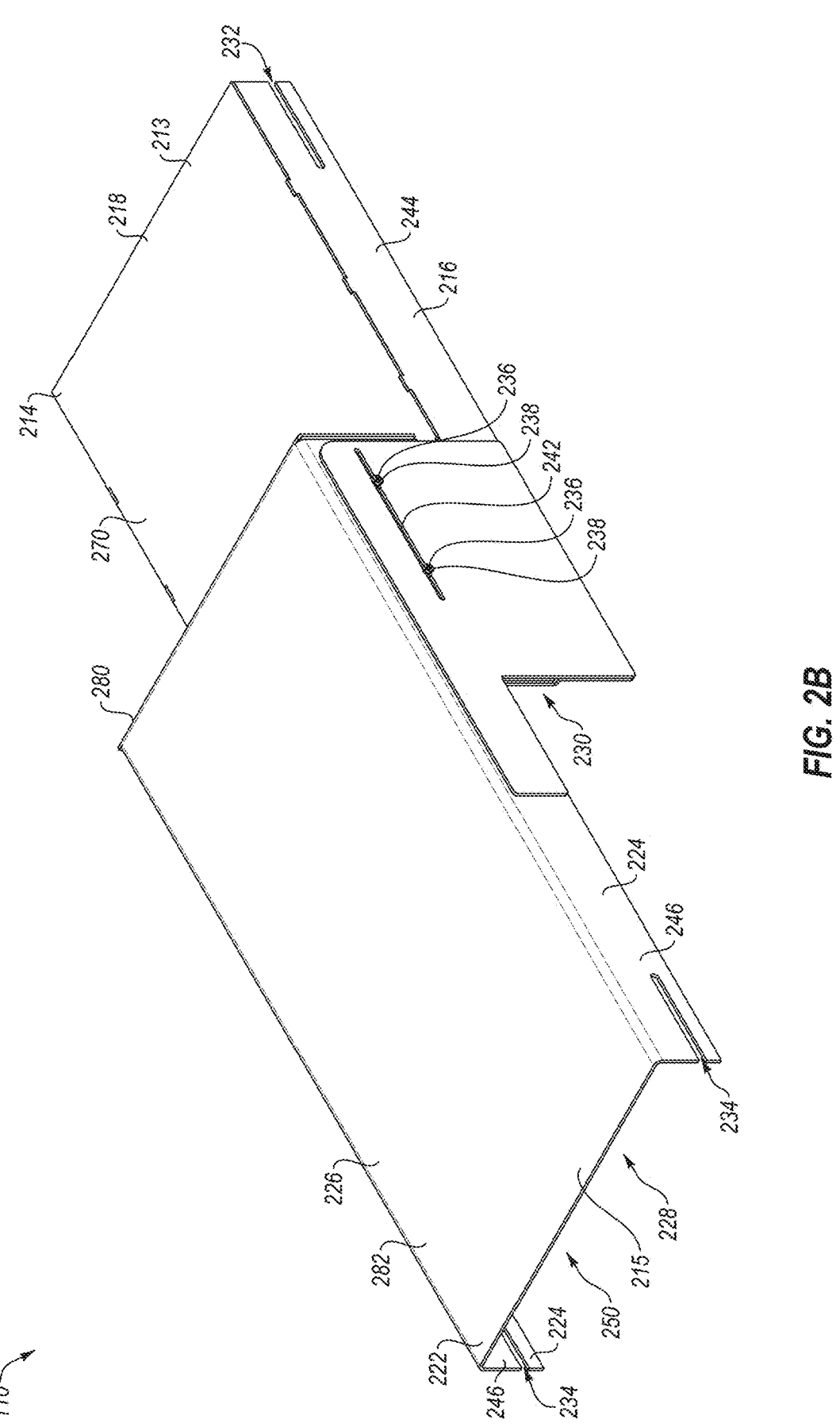
Figure 2C:
Figure 2D:

The CMS 104 may function as an above-ground wiring run along the installation surfaces 107a-b and over a transition 112 between the first installation surface 107a and the second installation surface 107b for the cable 103. In particular, the CMS 104 may define internal volumes 109 that extend along the first installation surface 107a and the second installation surface 107b and the CTS 110 may define volumes (such as denoted 220 and 228 in FIGS. 2D, 2E, and 2F) that are connected to the internal volumes 109 of the CMS 104 to route the cable 103 along the installation surfaces 107a-b and over the transition 112. The transition 112 may include an obstacle and/or may be or include a change between the first installation surface 107a and the second installation surface 107b. The transition 112 is illustrated in FIG. 1 as a ninety-degree transition for example purposes. However, it will be appreciated, with the benefit of the present disclosure, that the transition 112 may include other configurations such as a sloped transition angled between ten degrees and one hundred fifty degrees relative to the first installation surface 107a, a decorative curb, a rounded transition, a barrier, an obstacle, a tree root, or any other transition between the installation surfaces 107a-b.

With reference to FIGS. 2A-2F, the CTS 110 may include a first segment 214, a second segment 222, and side panels 240. The first segment 214 and the second segment 222 may be configured to interface with the installation surfaces 107a-b and to receive or house a portion of the cable 103. The first segment 214 may define a first opening 248 (shown in FIGS. 2D-2F) on a first plane 264 (shown in FIGS. 2E and 2F). The first plane 264 may extend along the first installation surface 107a. The first opening 248 may be configured to receive the cable 103 on the first plane 264 to permit the first segment 214 to receive or house a part of the cable 103 along the first plane 264.

Figure 2E:
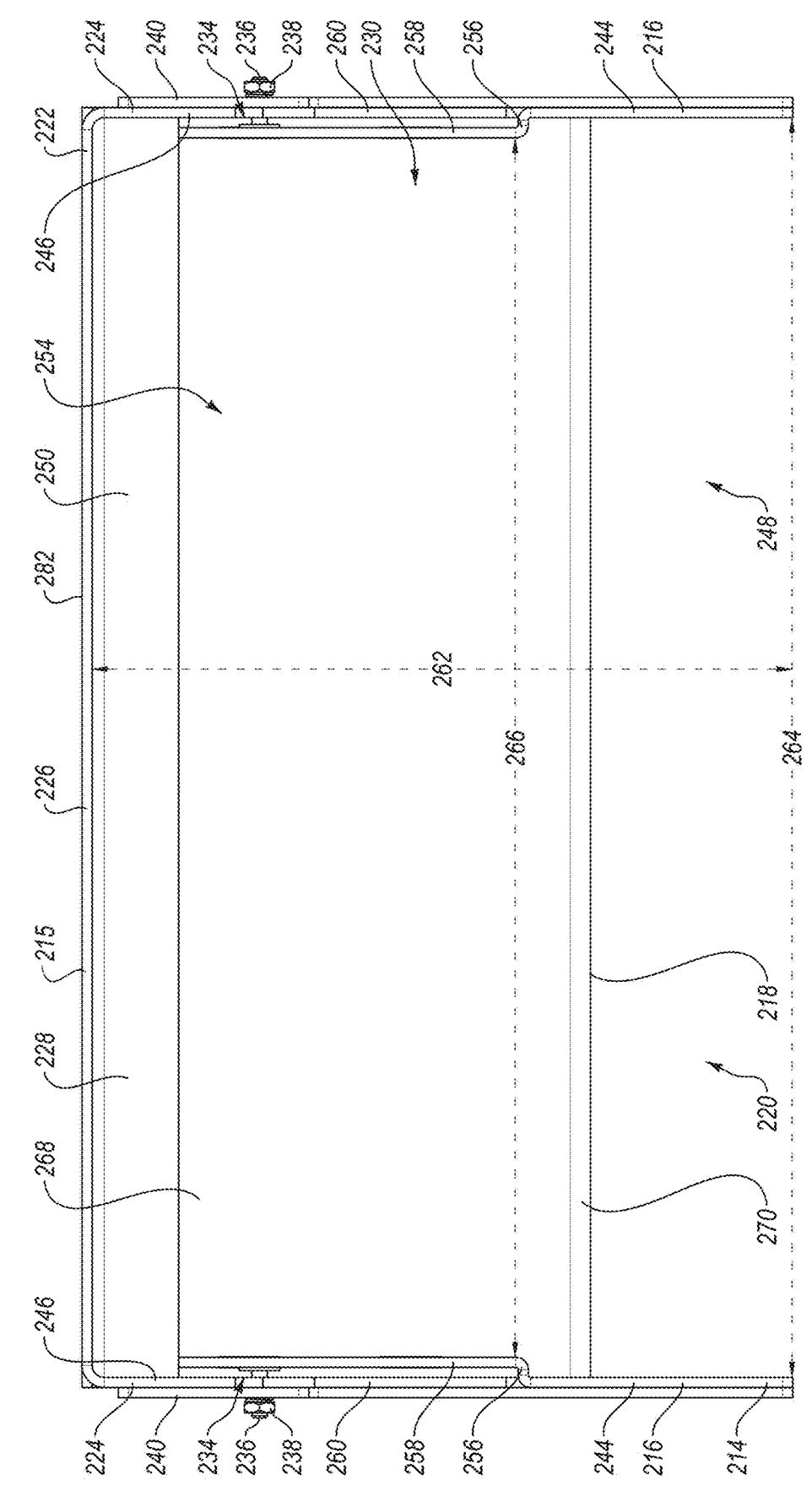
Figure 2F:
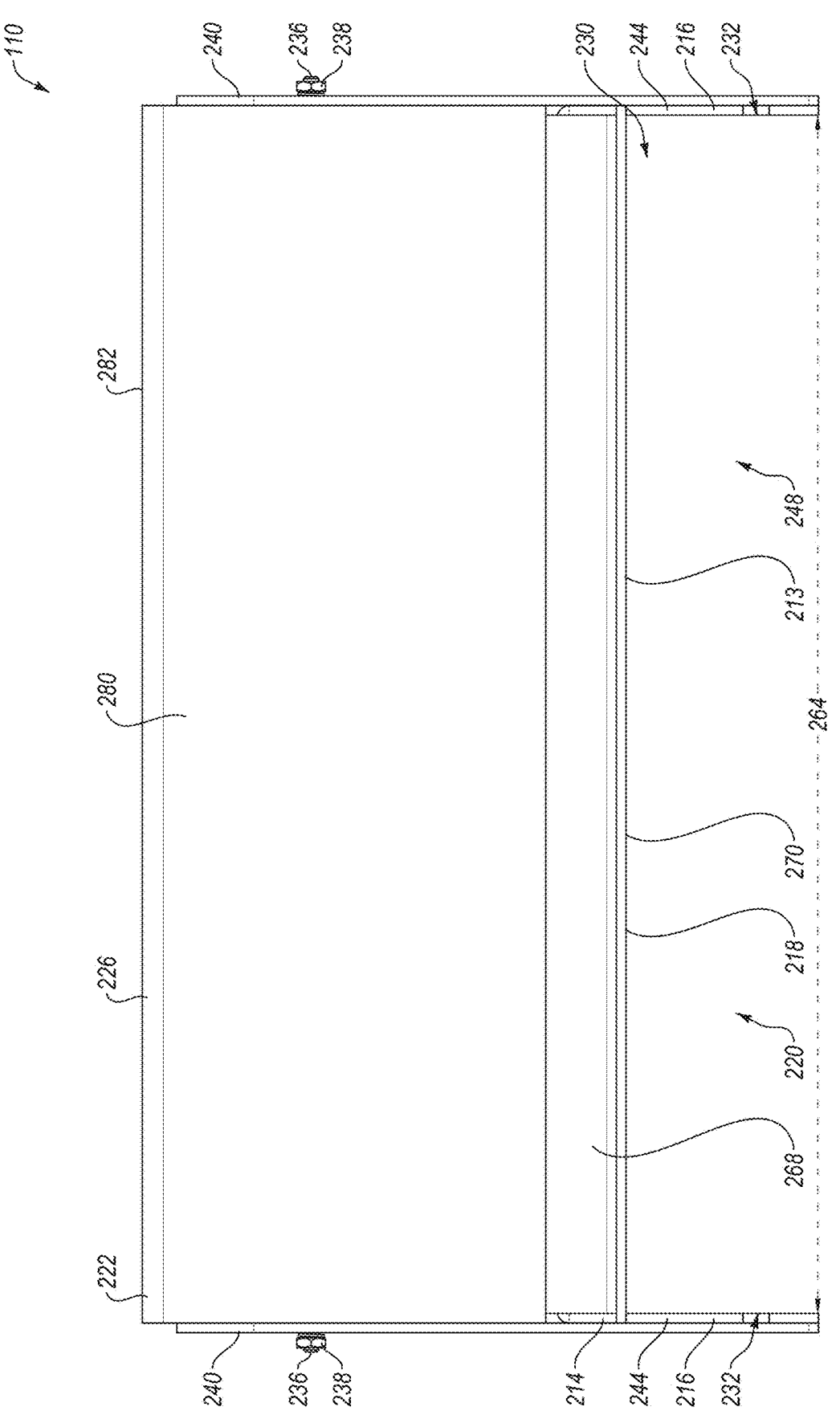
Figure 3A:
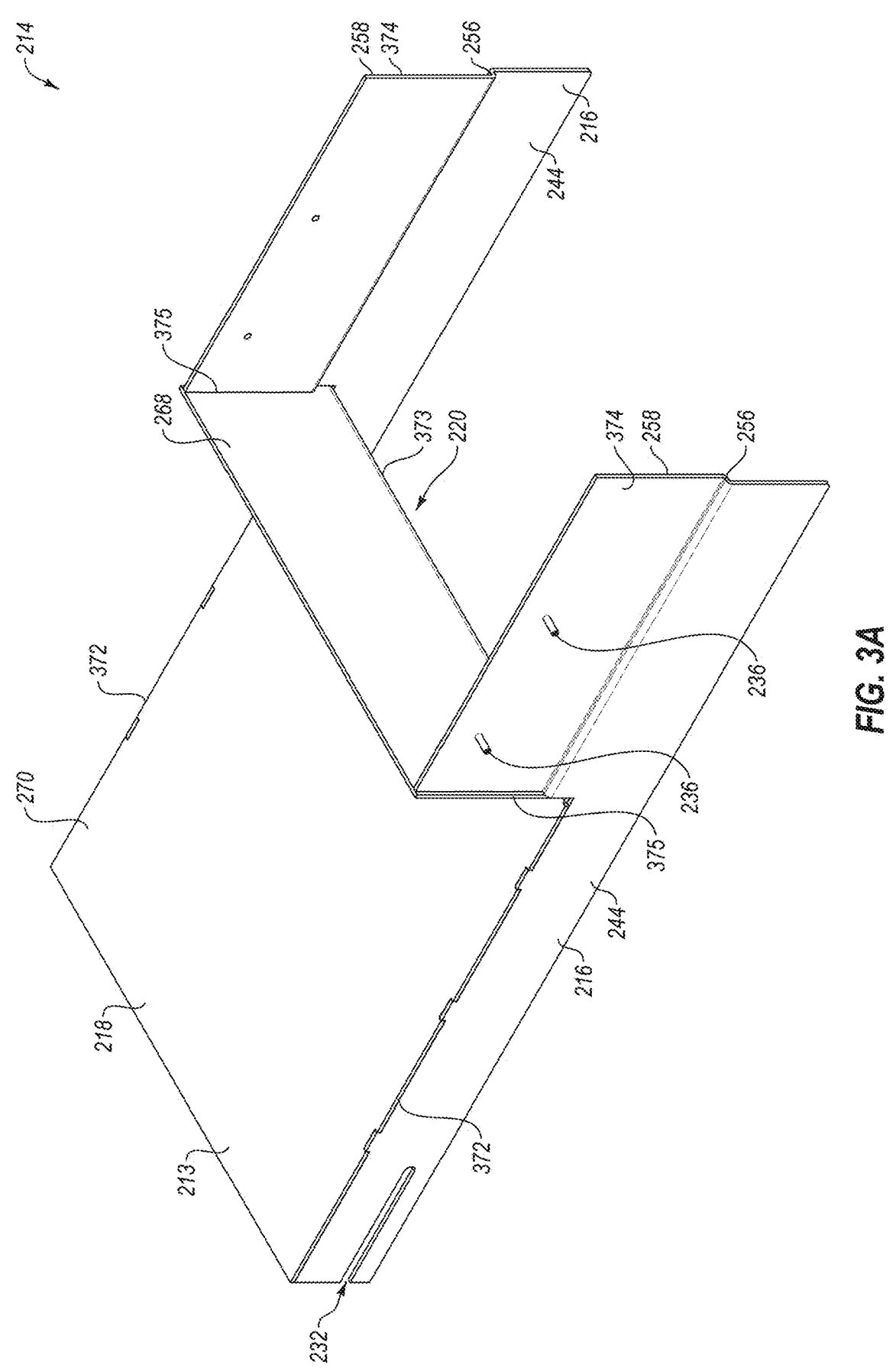
FIGS. 3A and 3B illustrate a left perspective view and a right perspective view of an example of the first segment of the CTS of FIGS. 2A-2F.
Figure 3B:
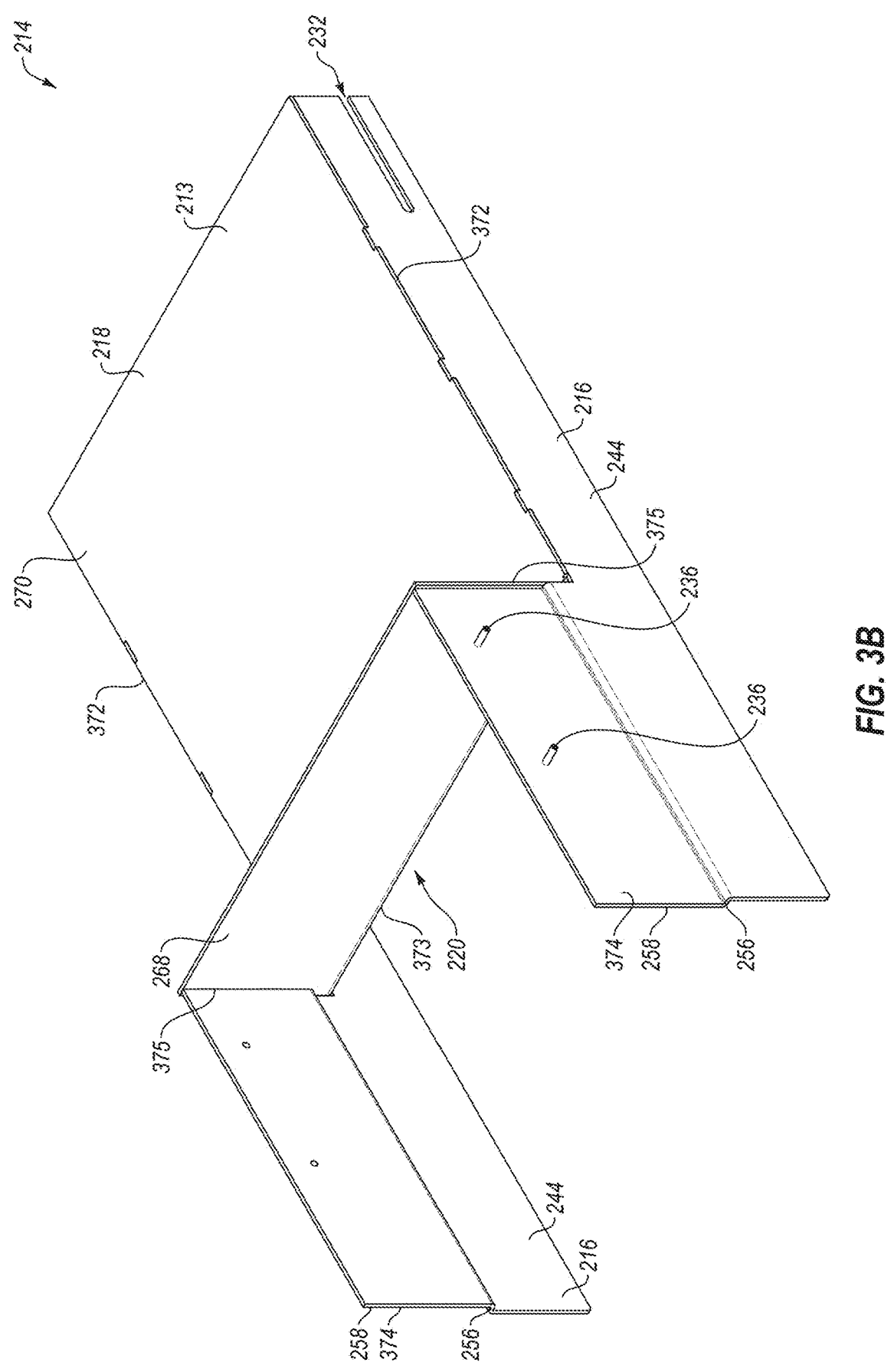

The second segment 222 may define a second opening 250 on a second plane 266 (shown in FIG. 2E). The second plane 266 may extend along the second installation surface 107b. The second opening 250 may be configured to receive the cable 103 on the second plane 266 to permit the second segment 222 to receive or house a part of the cable 103 along the second plane 266.

The first segment 214 may at least partially define a first volume 220 (shown in FIGS. 2D-2F) that extends along the first plane 264. The second segment 222 may at least partially define a second volume 228 that extends along the second plane 266. In addition, the second segment 222 and the side panels 240 may couple to the first segment 214 to define an adjustable volume 230. The first volume 220 and the second volume 228 may be connected to the adjustable volume 230 to form a contiguous volume for routing the cable 103 between the first opening 248 and the second opening 250 (e.g., through the CTS 110). An example of the cable 103 being routed between the first opening 248 and the second opening 250 through the first volume 220, the second volume 228, and the adjustable volume 230 is discussed below in relation to FIG. 7.

In some embodiments, portions of the first segment 214 and the second segment 222 may be housed within the CMS 104. For example, an end 213 of the first segment 214 may be positioned within part of the internal volume 109 of the CMS 104. As another example, an end 215 of the second segment 222 may be positioned within another part of the internal volume 109 of the CMS 104. The end 213 of the first segment 214 may be received by the CMS 104 to connect the first volume 220 to the internal volume 109 of the CMS 104. In addition, the end 215 of the second segment 222 may be received by the CMS 104 to connect the second volume 228 to the internal volume 109 of the CMS 104. Further, the end 213 of the first segment 214 and the end 215 of the second segment 222 may be housed within the CMS 104 to anchor the CTS 110 to the installation surface 107a-b via the CMS 104 and/or prevent the CTS 110 from being removed or the cables from being accessed.

With reference to FIGS. 2A-3B, the first segment 214 may include sidewalls 216. Each of the sidewalls 216 may include a first portion 244 that extends along the first plane 264. In addition, each of the sidewalls 216 may include a transition portion 256 (shown in FIGS. 2D, 2E, 3A, and 3B) that is connected to the first portion 244. Further, each of the sidewalls 216 may include a second portion 258 (shown in FIGS. 2E, 3A, and 3B) connected to the transition portion 256. The second portion 258 may be connected to the first portion 244 via the transition portion 256.

The first segment 214 may include a first top wall 218 connected to and extending between the sidewalls 216. The first top wall 218 may include a vertical wall 268 (shown in FIGS. 2D-3B) connected to a horizontal wall 270 to form a joint 373 (shown in FIGS. 3A and 3B). The horizontal wall 270 may connect to the sidewalls 216 to form joints 372 (shown in FIGS. 3A and 3B). The vertical wall 268 may connect to the sidewalls 216 to form joints 375 (shown in FIGS. 3A and 3B).

The sidewalls 216 and the first top wall 218 may at least partially define the first opening 248. In some embodiments, the sidewalls 216 and the first top wall 218 along with the first installation surface 107a may define the first opening

5

248. The sidewalls 216 and the first top wall 218 may at least partially define the first volume 220. In some embodiments, the sidewalls 216, the first top wall 218, the first installation surface 107*a*, and/or the transition 112 may define the first volume 220.

The sidewalls 216 may define slots 232. In particular, each of the first portions 244 may define one or more of the slots 232. The slots 232 may receive a part of the CMS 104 to position the first segment 214 relative to the CMS 104. For example, the slots 232 may receive (e.g., mate with) ground studs of the CMS 104. The first segment 214 may physically and/or electrically engage the CMS 104 (e.g., the ground studs) to electrically couple the CTS 110 to the CMS 104.

The sidewalls 216 may include protrusions 236 that extend from outer surfaces 374 (shown in FIGS. 3A and 3B) of the sidewalls 216 (e.g., the second portions 258). The protrusions 236 may be received by the second segment 222 and the side panels 240 to position the second segment 222 and the side panels 240 relative to the first segment 214 as discussed in more detail below.

With reference to FIGS. 2A-4B, the second segment 222 may include a sidewalls 224. Each of the sidewalls 224 may include a third portion 246 that extends along the second plane 266. In addition, each of the sidewalls 224 may include a fourth portion 260 (shown in FIGS. 2E, 4A, and 4B) that is connected to the third portion 246.

The second segment 222 may include a second top wall 226 connected to and extending between the sidewalls 224. The second top wall 226 may include a vertical wall 280 connected to a horizontal wall 282 to form a joint 484 (shown in FIGS. 4A and 4B). The horizontal wall 282 may connect to the sidewalls 224 to form joints 485 (shown in FIGS. 4A and 4B). The vertical wall 280 may connect to the sidewalls 224 to form joints 487 (shown in FIGS. 4A and 4B).

The fourth portions 260 and the vertical wall 280 may at least partially define a segment opening 254 (shown in FIGS. 2D and 2E). The segment opening 254 may be sized and shaped to receive the second portions 258 and the vertical wall 268 of the first segment 214.

The sidewalls 224 and the second top wall 226 may at least partially define the second opening 250. In some embodiments, the sidewalls 224 and the second top wall 226 along with the second installation surface 107*b* may define the second opening 250. The sidewalls 224 and the second top wall 226 may at least partially define the second volume 228. In some embodiments, the sidewalls 224, the second top wall 226, the second installation surface 107*b*, and/or the transition 112 may define the second volume 228.

The sidewalls 224 may define slots 234. In particular, one or more of the third portions 246 may define one or more of the slots 234. The slots 234 may receive a part of the CMS 104 to position the second segment 222 relative to the CMS 104. For example, the slots 234 may receive (e.g., mate with) ground studs of the CMS 104. The second segment 222 may physically and/or electrically engage the CMS 104 (e.g., the ground studs) to electrically couple the CTS 110 to the CMS 104.

Figure 4A:
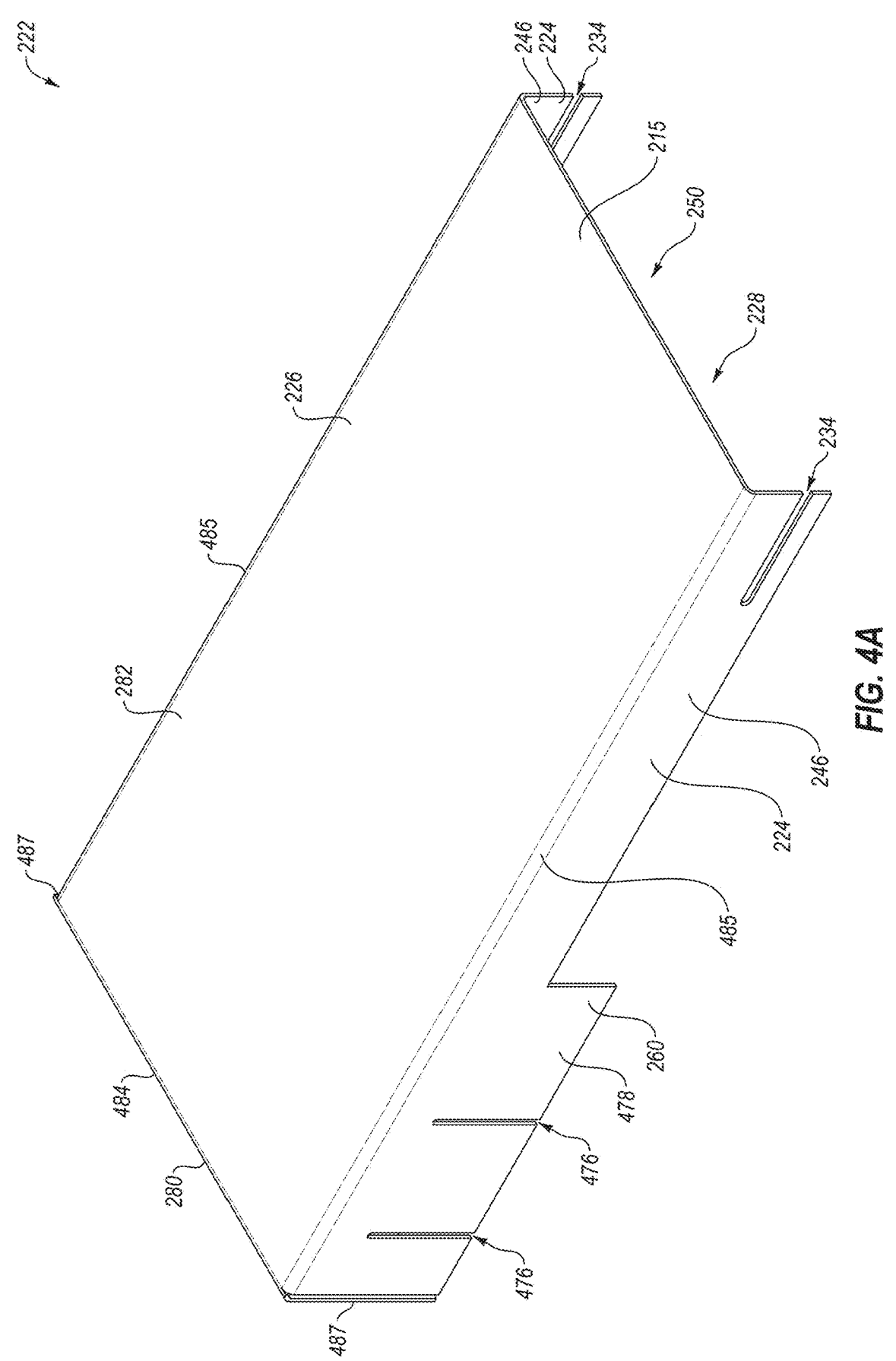
FIGS. 4A and 4B illustrate a left perspective view and a right perspective view of an example of the second segment of the CTS of FIGS. 2A-2F.
Figure 4B:
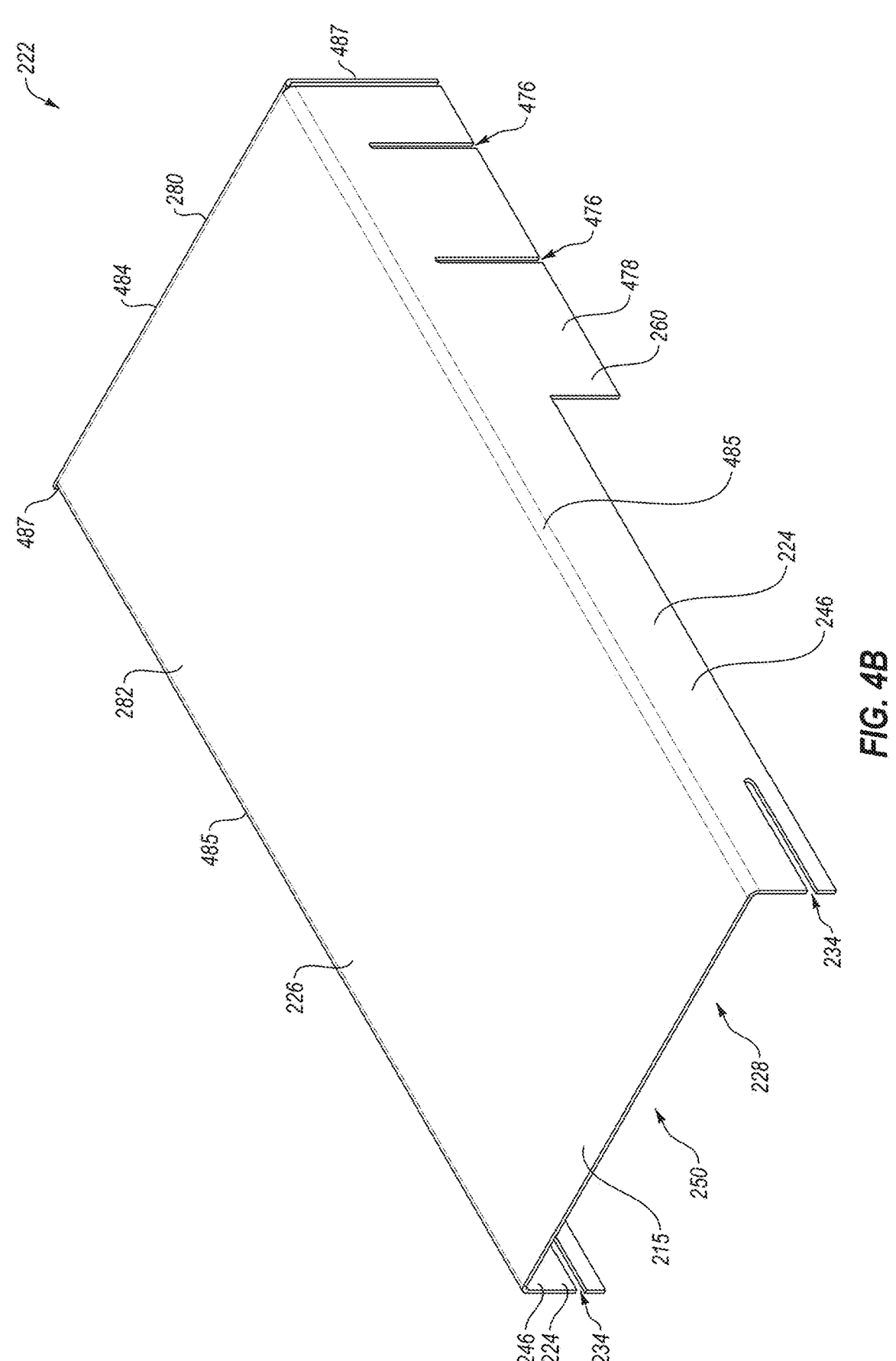

The second segment 222 may define protrusion openings 476 (shown in FIGS. 4A and 4B). The protrusion openings 476 may receive at least part of the corresponding protrusions 236. The protrusion openings 476 may receive the corresponding protrusions 236 to position the second segment 222 relative to the first segment 214. In addition, the protrusion openings 476 may receive the corresponding protrusions 236 to connect the first volume 220 to the adjustable volume 230 and to connect the second volume 228 to the adjustable volume 230.

The protrusion openings 476 may include slots, holes, or any other appropriate opening. The protrusion openings 476 may permit a position of the second segment 222 relative to the first segment 214 to be adjusted while maintaining engagement between the two segments 214, 222 at any relative position in which the protrusions 236 are positioned anywhere within corresponding protrusion openings 476. For example, the protrusion openings 476 may permit the position of the second segment 222 relative to the first segment 214 to be adjusted to increase a vertical distance between the horizontal wall 282 of the second segment 222 and the horizontal wall 270 of the first segment 214. Adjusting the position of the second segment 222 relative to the first segment 214 may permit a height 262 (shown in FIG. 2E) of the adjustable volume 230 to be increased or reduced. The height 262 of the adjustable volume 230 being changed may permit the CTS 110 to physically engage transitions of different heights and/or sizes.

Figure 5:
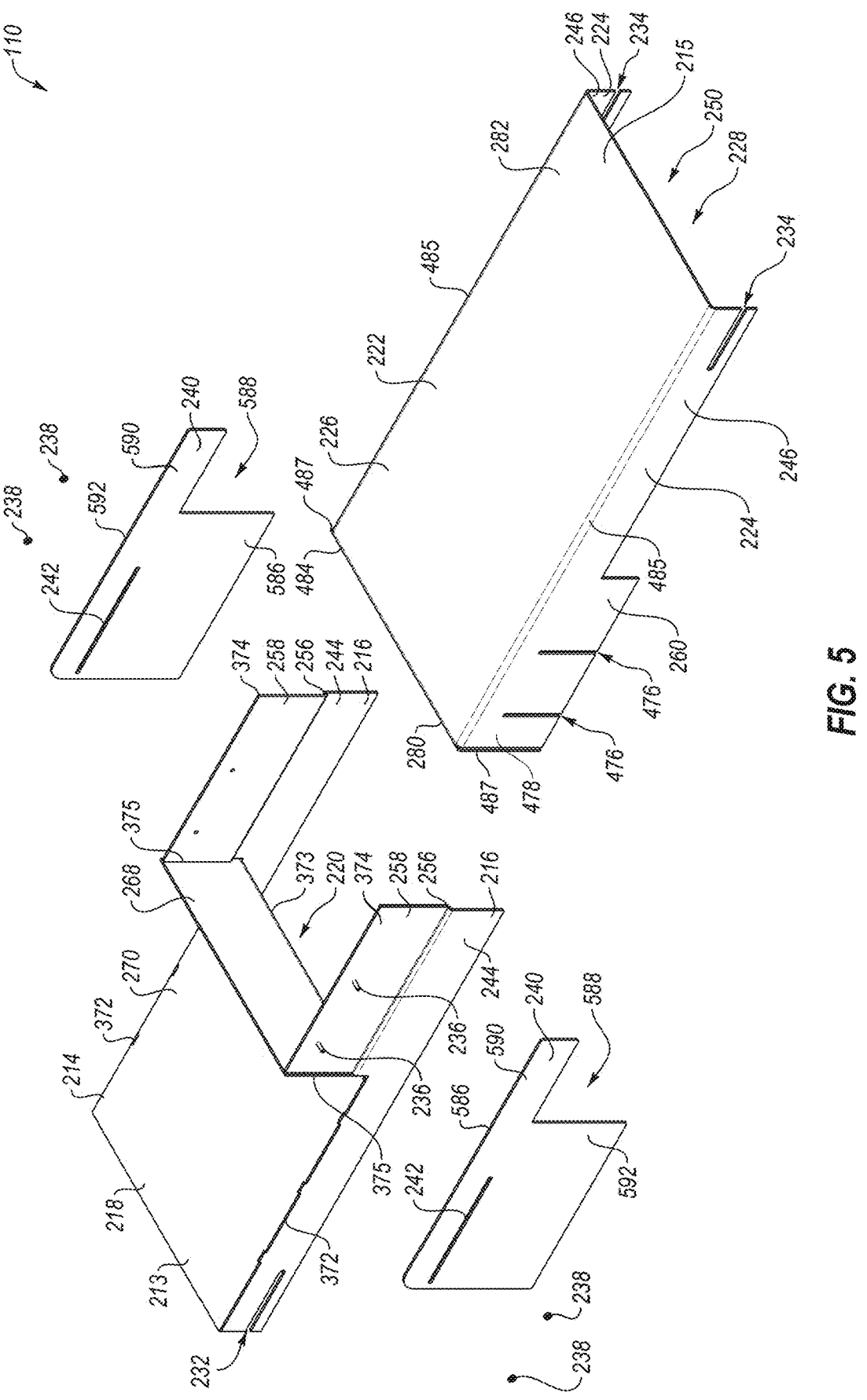
FIG. 5 illustrates an exploded view of the example CTS of FIGS. 2A-2F.

With reference to FIGS. 2A-5, the side panels 240 may include inner surfaces 586 (shown in FIG. 5). The inner surfaces 586 may physically engage part of the outer surfaces 374 of the sidewalls 216 of the first segment 214 (e.g., outer surfaces of the first segment 214). In addition, the inner surfaces 586 may physically engage parts of outer surfaces 478 (shown in FIGS. 4A and 4B) of the sidewalls 224 of the second segment 222.

The side panels 240 may define panel openings 242 (shown in FIGS. 2A, 2B, and 5). The panel openings 242 may receive at least part of the corresponding protrusions 236. The panel openings 242 may receive the corresponding protrusions 236 to position the side panels 240 relative to the first segment 214, the second segment 222, or both. In addition, the panel openings 242 may receive the corresponding protrusions 236 to cause the inner surfaces 586 of the side panels 240 to further define the adjustable volume 230.

The panel openings 242 may include slots, holes, or any other appropriate opening. The panel openings 242 may permit a position of the side panels 240 relative to the first segment 214, the second segment 222, or both to be adjusted. For example, the panel openings 242 may permit the position of the side panels 240 relative to the first segment 214, the second segment 222, or both to be adjusted to increase or reduce a distance between a leading edge (denoted in FIG. 2D as 219) of the side panels 240 and the vertical wall 280 of the second segment 222 and/or a distance between the leading edge 219 of the side panels 240 and the horizontal wall 270 of the first segment 214 (e.g., horizontally). The position of the side panels 240 may be independently adjusted. The position of the side panels 240 may be adjusted to permit the leading edge 219 of the side panels 240 to engage or be proximate the transition 112.

Adjusting the position of the side panels 240 relative to the first segment 214, the second segment 222, or both may permit a depth 252 (shown in FIG. 2D) of the adjustable volume 230 to be increased or reduced. The depth 252 of the adjustable volume 230 being changed may permit the CTS 110 to physically engage transitions of different depths, sizes, or distances from the first segment 214. In addition, adjusting the position of the side panels 240 relative to the first segment 214, the second segment 222, or both may permit the side panels 240 to be positioned proximate to transitions at different horizontal distances from the vertical wall 268 of the first segment 214 and/or the vertical wall 280 of the second segment 222.

Each of the side panels 240 may include a body 592 (shown in FIG. 5) and a protrusion portion 590 (shown in FIG. 5) that extends from the body 592. The protrusion portions 590 may extend from the bodies 592 such that at least part of the protrusion portions 590 are positioned above the transition 112 when installed. In addition, the protrusion portions 590 and the bodies 592 may define cutouts 588 (shown in FIG. 5). The cutouts 588 may be configured to receive at least a portion of the transition 112. In some embodiments, a shape of the cutouts 588 may correspond to a shape of the transition 112. For example, as illustrated in FIG. 5, the cutouts 588 may include a square shape that corresponds to a ninety-degree curb.

The CTS 110 may include fasteners 238 (shown in FIGS. 2A-2F and 5) that are configured to interface with the corresponding protrusions 236. The fasteners 238 may interface with the protrusions 236 via the protrusion openings 476 (shown in FIGS. 4A and 4B), the panel openings 242, or both. The fasteners 238 may interface with the protrusions 236 to couple the side panels 240 to the first segment 214, the second segment 222, or both. For example, the fasteners 238 may interface with the protrusions 236 to draw the side panels 240 towards the sidewalls 216 of the first segment 214. As another example, the fasteners 238 may interface with the protrusions 236 to draw the side panels 240 towards the sidewalls 224 of the second segment 222. In addition, the fasteners 238 may interface with the protrusions 236 to couple the second segment 222 to the first segment 214.

The CTS 110 may include a metal material. For example, the CTS 110 may include sheet metal, an aluminum material, a steel material, or some combination thereof. In addition, the CTS 110 may include a material that is strong enough to withstand loads without internal structures positioned within the first volume 220, the second volume 228, and/or the adjustable volume 230. For example, the CTS 110 may include a $\frac{1}{8}^{th}$ inch metal material. The CTS 110 may be treated to prevent corrosion due to environmental factors such as rain, snow, humidity, or any other environmental factor. For example, the CTS 110 may include a galvanized material, a powder coated material, or any other appropriate material.

The ends 213, 215 of the CTS 110 are illustrated in FIGS. 2A-5 as including rectangular shapes for example purposes. However, it will be appreciated, with the benefit of the present disclosure, that the shapes of the ends 213, 215 may include any appropriate or desired shape such as a trapezoidal shape, a circular shape, a diamond shape, or any other appropriate or desired shape. In addition, the CTS 110 is illustrated and described in relation to FIGS. 2A-5 as the ends 213, 215 being received by the CMS 104. Stated another way, each of the ends 213, 215 may be substantially surrounded by corresponding ends of the CMS 104. However, it will be appreciated, with the benefit of the present disclosure, that one or both of the ends 213, 215 may receive an end of the CMS 104 to connect the internal volume 109 of the CMS 104 and the volumes 220, 228 of the CTS 110. For example, the end 213 of the first segment 214 may receive the end of the CMS 104 and the end 215 of the second segment 222 may be received by the CMS 104. As another example, the end 213 of the first segment 214 may be received by the end of the CMS 104 and the end 215 of the second segment 222 may receive the end of the CMS 104. As yet another example, the end 213 of the first segment 214 may receive the end of the CMS 104 and the end 215 of the second segment 222 may receive another end of the CMS 104.

Figure 6:
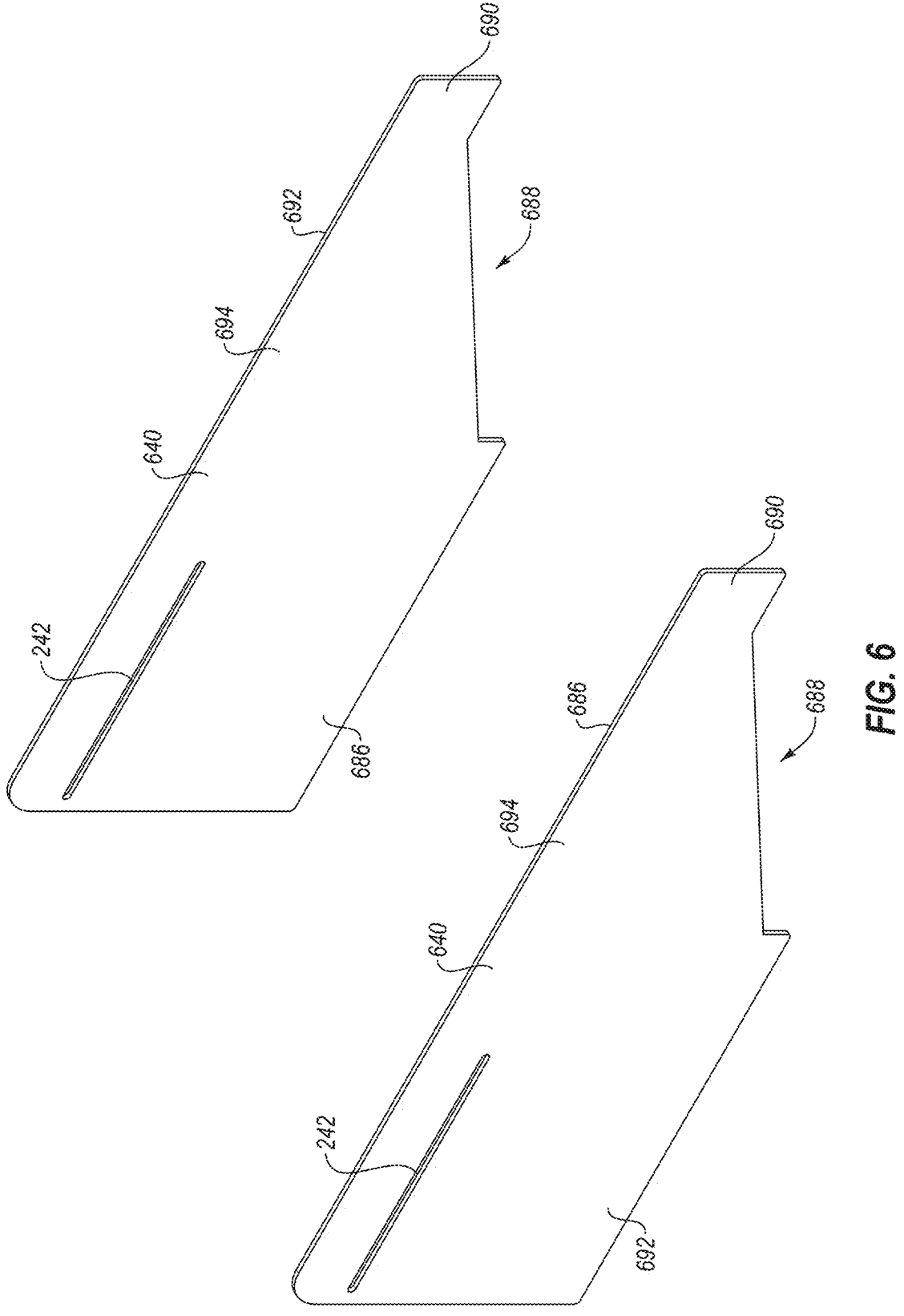
FIG. 6 illustrates a left perspective view of example side panels that may be implemented in a CTS.

With reference to FIG. 6, sloped side panels 640 that may be implemented in place of the side panels 240 of FIGS. 2A-2F and 5 are shown. The sloped side panels 640 may be similar or comparable to the side panels 240 shown in FIGS. 2A-2F and 5, although with a variation in cutouts 688 compared to the cutouts 588 of the side panels 240. Each of the sloped side panels 640 may include an inner surface 686. The inner surfaces 686 may physically engage part of the outer surfaces 374 of the sidewalls 216 of the first segment 214. In addition, the inner surfaces 686 may physically engage parts of the outer surfaces 478 of the sidewalls 224 of the second segment 222.

Each of the sloped side panels 640 may include a transition portion 694 that connects a body 692 to a protrusion portion 690. The protrusion portions 690 may extend from the transition portions 694 such that at least part of the protrusion portions 690 are positioned above the transition 112 when installed. In addition, the protrusion portions 690, the transition portions 694, and/or the bodies 692 may define the cutouts 688. The cutouts 688 may be configured to receive at least a portion of the transition 112. In some embodiments, a shape of the cutouts 688 may correspond to a shape of the transition 112. For example, as illustrated in FIG. 6, the cutouts 688 may include a sloped shape that may correspond to a sloped curb or a decorative curb.

Figure 7:
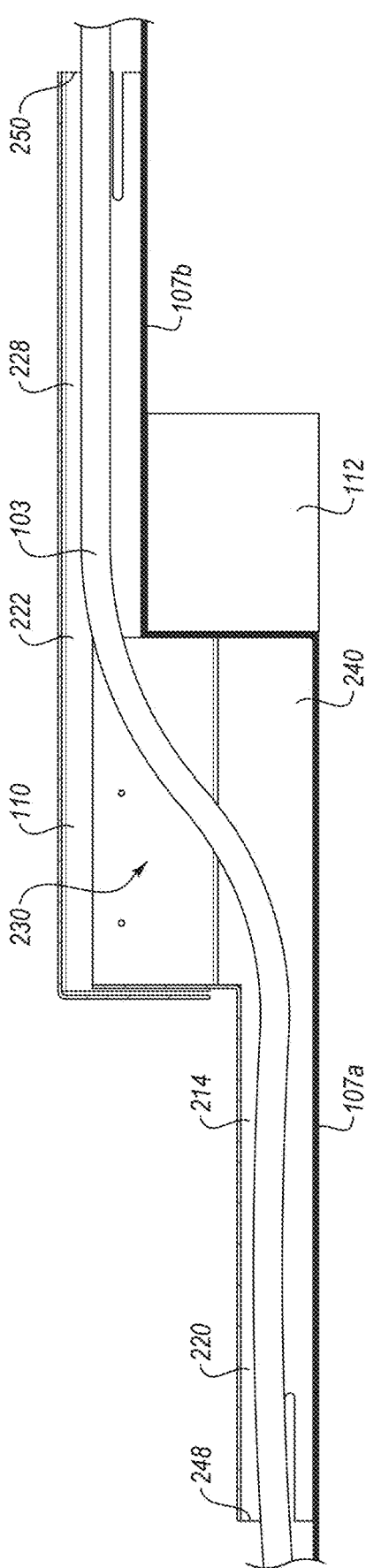
FIG. 7 illustrates a cross sectional view of the CTS of FIGS. 2A-2F along with the transition and the cable of FIG. 1.

With reference to FIG. 7, the CTS 110 may route the cable 103 along at least a portion of the installation surfaces 107a-b and over the transition 112. In particular, the cable 103 may be received by the second segment 222 via the second opening 250 and the cable 103 may traverse the second volume 228 along the second installation surface 107b, traverse the adjustable volume 230 to transition between the second volume 228 and the first volume 220, and traverse the first volume 220 along the first installation surface 107a such that the CTS 110 may provide the cable 103 via the first opening 248. Additionally or alternatively, the cable 103 may be received by the first segment 214 via the first opening 248. Further, the cable 103 may traverse the first volume 220 along the first installation surface 107a, traverse the adjustable volume 230 to transition between the second volume 228 and the first volume 220, and traverse the second volume 228 along the second installation surface 107b such that the CTS 110 may provide the cable 103 via the second opening 250.

Figure 8A:
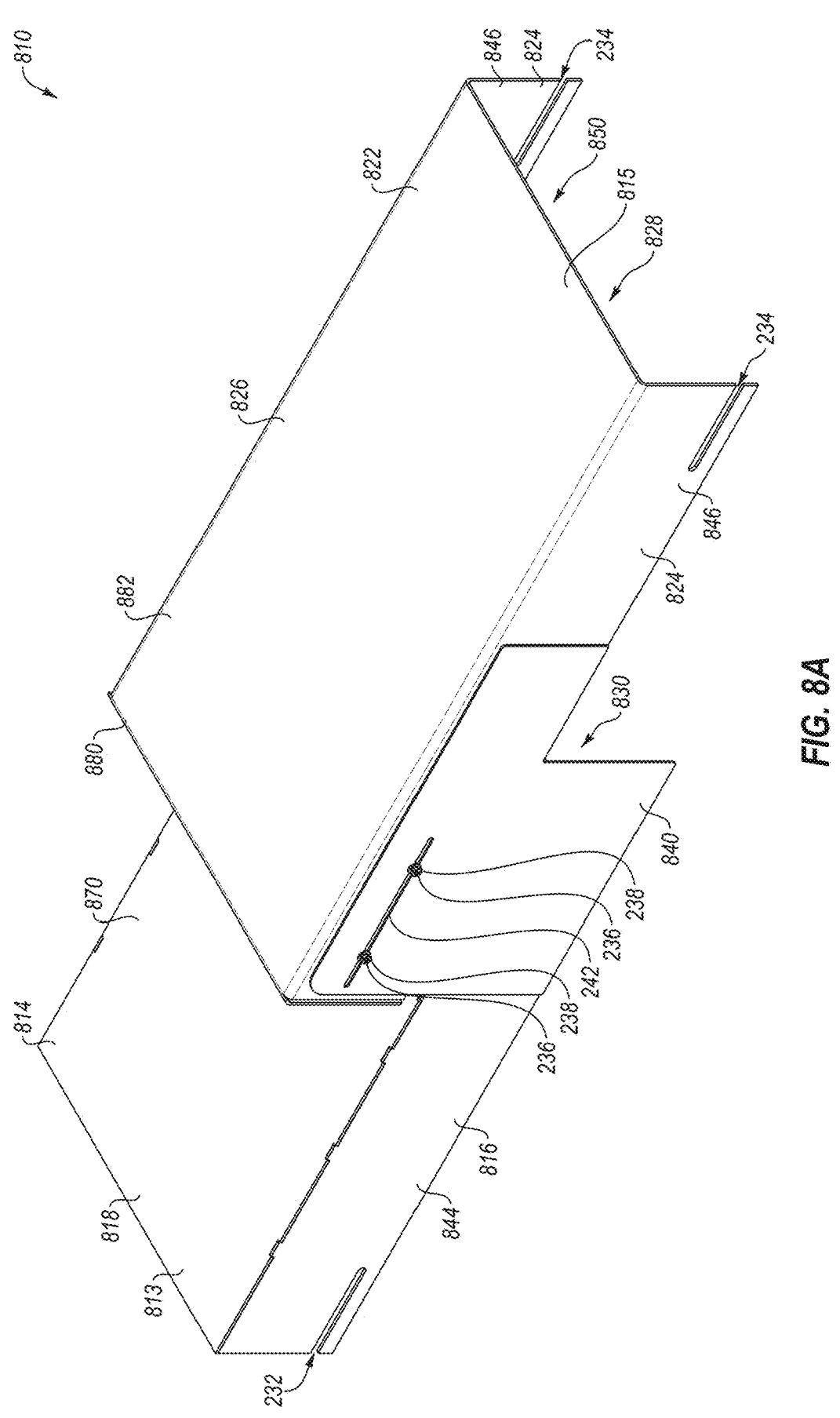
FIGS. 8A and 8B illustrate a left perspective view and a back right perspective view of another example CTS.
Figure 8B:
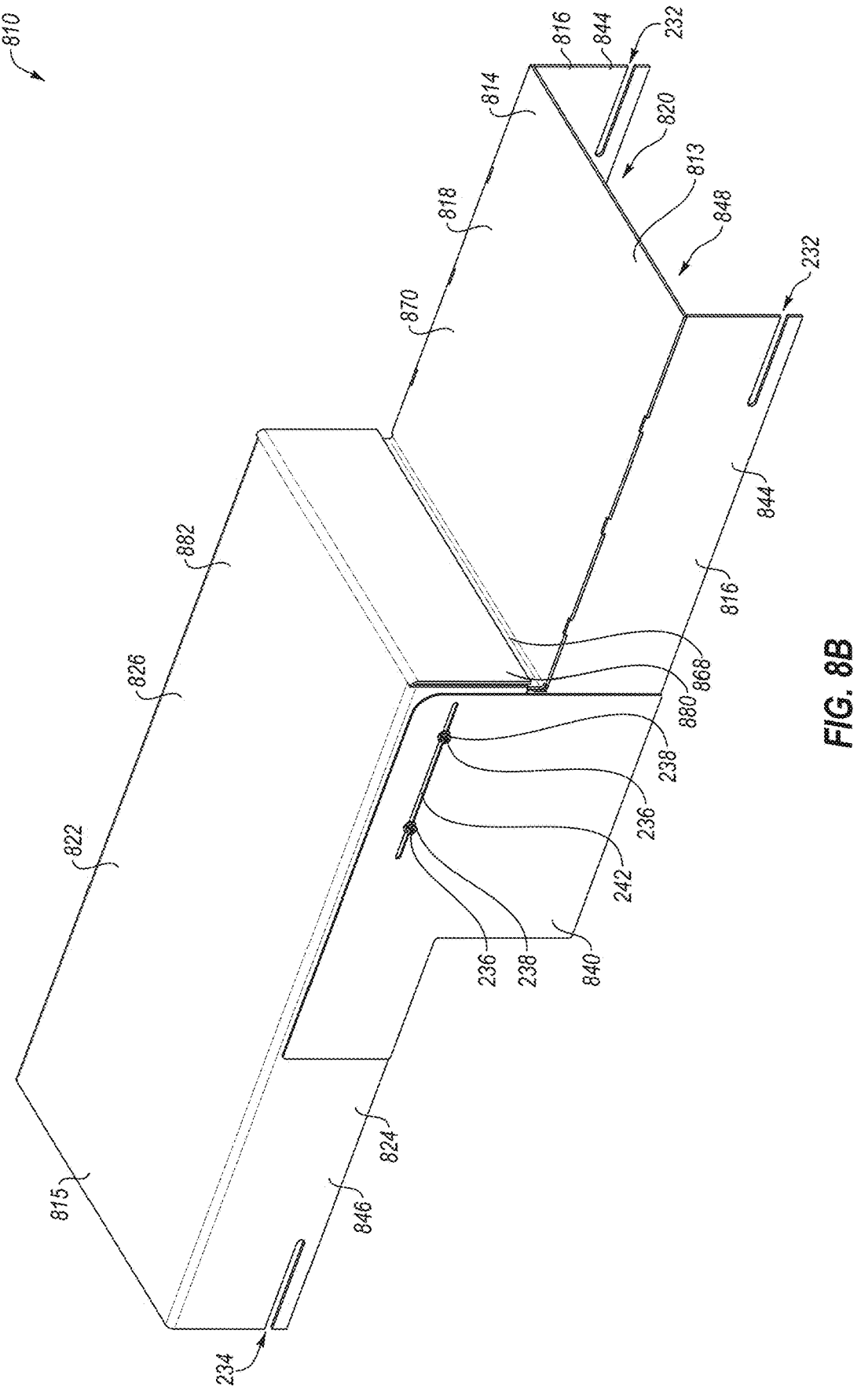

With reference to FIGS. 8A and 8B, a double CTS 810 is illustrated. The double CTS 810 may be similar or comparable to the CTS 110 of FIGS. 1-5, but includes a first segment 814, a second segment 822, and side panels 840 that include greater heights compared to the first segment 214, the second segment 222, and the side panels 240 of the CTS 110 of FIGS. 1-5.

The double CTS 810 may include volumes that are larger than the volumes of the CTS 110 of FIGS. 1-5 due to the greater heights. For example, a first volume 820 of the double CTS 810 may be greater than the first volume 220 of the CTS 110. As another example, a second volume 828 of the double CTS 810 may be greater than the second volume 228 of the CTS 110. As yet another example, an adjustable volume 830 of the double CTS 810 may be greater than the adjustable volume 230 of the CTS 110. The greater volumes may permit the double CTS 810 to house stacked cables or more cables than the CTS 110. Additionally or alternatively, the greater volumes may permit the double CTS 810 to house cables that are stiffer and need a larger bend radius.

The first segment 814 and the second segment 822 may be configured to interface with the installation surfaces 107a-b and receive or house portions of the cable 103 (not illustrated in FIGS. 8A and 8B). The first segment 814 may define a first opening 848 configured to receive the cable 103 to permit the first segment 814 to receive or house a portion of the cable 103. The second segment 822 may define a second opening 850 configured to receive the cable 103 to permit the second segment 822 to receive or house a portion of the cable 103.

The first segment 814 may at least partially define the first volume 820. The second segment 822 may at least partially define the second volume 828. In addition, the second segment 822 and the side panels 840 may couple to the first segment 814 to define the adjustable volume 830. The first volume 820 and the second volume 828 may be connected to the adjustable volume 830 to form a contiguous volume for routing the cable 103 between the first opening 848 and the second opening 850 (e.g., through the CTS 810).

In some embodiments, portions of the first segment 814 and the second segment 822 may be housed within the CMS 104. For example, an end 813 of the first segment 814 may be positioned within part of the internal volume 109 of the CMS 104. As another example an end 815 of the second segment 822 may be positioned within another part of the internal volume 109 of the CMS 104. The end 813 of the first segment 814 may be received by the CMS 104 to connect the first volume 820 to the internal volume 109 of the CMS 104. In addition, the end 815 of the second segment 822 may be received by the CMS 104 to connect the second volume 828 to the internal volume 109 of the CMS 104. Further, the end 813 of the first segment 814 and the end 815 of the second segment 822 may be housed within the CMS 104 to anchor the CTS 810 to the installation surfaces 107a-b via the CMS 104 and/or to prevent the CTS 810 from being removed or the cable 103 from being accessed.

The first segment 814 may include sidewalls 816. Each of the sidewalls 816 may include a first portion 844. In addition, each of the sidewalls 816 may include a transition portion (not shown in FIGS. 8A and 8B) that is connected to the first portion 844 in an analogous arrangement to that shown and discussed above in relation to in FIGS. 2A-5. Further, each of the sidewalls 816 may include a second portion (not shown in FIGS. 8A and 8B) connected to the transition portion in an analogous arrangement to that shown and discussed above in relation to FIGS. 2A-5. The second portion may be connected to the first portion 844 via the transition portion in an analogous arrangement to that shown and discussed above in relation to FIGS. 2A-5.

The first segment 814 may include a first top wall 818 connected to and extending between the sidewalls 816. The first top wall 818 may include a vertical wall 868 connected to a horizontal wall 870. The horizontal wall 870 may connect to the sidewalls 816. The vertical wall 868 may also connect to the sidewalls 816.

The sidewalls 816 and the first top wall 818 may at least partially define the first opening 848. In some embodiments, the sidewalls 816 and the first top wall 818 along with the first installation surface 107a may define the first opening 848. The sidewalls 816 and the first top wall 818 may at least partially define the first volume 820. In some embodiments, the sidewalls 816, the first top wall 818, the first installation surface 107a, and/or the transition 112 (not shown in FIGS. 8A and 8B) may define the first volume 820.

The sidewalls 816 may define the slots 232. In particular, each of the first portions 844 may define one or more of the slots 232. The sidewalls 816 may include the protrusions 236 that extends from the sidewalls 816 (e.g., the second portions). The protrusions 236 may be received by the second segment 822 and the side panels 840 to position the second segment 822 and the side panels 840 relative to the first segment 814.

The second segment 822 may include sidewalls 824. Each of the sidewalls 824 may include a third portion 846. In addition, each of the sidewalls 824 may include a fourth portion (not shown in FIGS. 8A and 8B) connected to the third portion 846 in an analogous arrangement to that shown and discussed above in relation FIGS. 2A-5. The second segment 822 may include a second top wall 826 connected to and extending between the sidewalls 824. The second top wall 826 may include a vertical wall 880 connected to a horizontal wall 882. The horizontal wall 882 may connect to the sidewalls 824. The vertical wall 880 may also connect to the sidewalls 824.

The fourth portions and the vertical wall 880 may at least partially define a segment opening (not shown in FIGS. 8A and 8B) in an analogous arrangement to that shown and discussed above in relation FIGS. 2A-5. The segment opening may be sized and shaped to receive the second portions and the vertical wall 868 of the first segment 814.

The sidewalls 824 and the second top wall 826 may at least partially define the second opening 850. In some embodiments, the sidewalls 824 and the second top wall 826 along with the second installation surface 107b may define the second opening 850. The sidewalls 824 and the second top wall 826 may at least partially define the second volume 828. In some embodiments, the sidewalls 824, the second top wall 826, the second installation surface 107b, and/or the transition 112 may define the second volume 828. The sidewalls 824 may define the slots 234. In particular, one or more of the third portions 846 of the sidewalls 824 may define one or more of the slots 234.

The second segment 822 may define protrusion openings (not shown in FIGS. 8A and 8B) in an analogous arrangement to that shown and discussed above in relation to FIGS. 2A-5. The protrusion openings may receive at least part of the corresponding protrusions 236. The protrusion openings may receive the corresponding protrusions 236 to position the second segment 822 relative to the first segment 814. In addition, the protrusion openings may receive the corresponding protrusions 236 to connect the first volume 820 to the adjustable volume 830 and to connect the second volume 828 to the adjustable volume 830.

The protrusion openings may permit a position of the second segment 822 relative to the first segment 814 to be adjusted while maintaining engagement between the two segments 814, 822 at any relative position in which the protrusions 236 are positioned anywhere within corresponding protrusion openings. For example, the protrusion openings may permit the position of the second segment 822 relative to the first segment 814 to be adjusted to increase a distance between the vertical wall 880 of the second segment 822 and the horizontal wall 870 of the first segment 814 (e.g., vertically). Adjusting the position of the second segment 822 relative to the first segment 814 may permit a height (not shown in FIGS. 8A and 8B) of the adjustable volume 830 to be increased or reduced. The height of the adjustable volume 830 being changed may permit the CTS 810 to physically engage transitions of different heights and/or sizes.

The side panels 840 may include inner surfaces (not shown in FIGS. 8A and 8B) in an analogous arrangement to that shown and discussed above in relation to FIGS. 2A-5. The inner surfaces may physically engage part of the outer surfaces of the sidewalls 816 of the first segment 814. In addition, the inner surfaces may physically engage parts of outer surfaces (not shown in FIGS. 8A and 8B) of the sidewalls 824 of the second segment 822.

The side panels 840 may define the panel openings 242. The panel openings 242 may permit a position of the side panels 840 relative to the first segment 814, the second segment 822, or both to be adjusted. For example, the panel openings 242 may permit the position of the side panels 840 relative to the first segment 814, the second segment 822, or both to be adjusted to increase or reduce a distance between a leading edge (not shown in FIGS. 8A and 8B) of the side panels 840 and the vertical wall 880 of the second segment 822 and/or a distance between the leading edge of the side panels 840 and the horizontal wall 870 of the first segment 814 (e.g., horizontally). The position of the side panels 840 may be independently adjusted. In these and other embodiments, the position of the side panels 840 may be adjusted to permit the leading edge of the side panels 840 to engage or be proximate the transition 112.

Adjusting the position of the side panels 840 relative to the first segment 814, the second segment 822, or both may permit a depth (not shown in FIGS. 8A and 8B) of the adjustable volume 830 to be increased or reduced in an analogous arrangement to that shown and discussed above in relation FIGS. 2A-5. The depth of the adjustable volume 830 being changed may permit the CTS 810 to physically engage transitions of different depths, sizes, or distances from the first segment 814. In addition, adjusting the position of the side panels 840 relative to the first segment 814, the second segment 822, or both may permit the side panels 840 to be positioned proximate transitions at different distances from the vertical wall 868 of the first segment 814, the vertical wall 880 of the second segment 822, or both.

The CTS 810 may include the fasteners 238 that are configured to interface with the corresponding protrusions 236. The fasteners 238 may interface with the protrusions 236 to couple the side panels 840 to the first segment 814, the second segment 822, or both. In addition, the fasteners 238 may interface with the protrusions 236 to couple the second segment 822 to the first segment 814. For example, the fasteners 238 may interface with the protrusions 236 to draw the side panels 840 towards the sidewalls 816 of the first segment 814. As another example, the fasteners 238 may interface with the protrusions 236 to draw the side panels 840 towards the sidewalls 824 of the second segment 822. In some embodiments, each of the protrusions 236 includes a bolt and/or other component with a threaded shaft while each of the fasteners 238 includes a nut and/or washer to mate with the threaded shaft of the corresponding protrusion 236.

The ends 813, 815 of the CTS 810 are illustrated in FIGS. 8A and 8B as including rectangular shapes for example purposes. However, it will be appreciated, with the benefit of the present disclosure, that the shapes of the ends 813, 815 may include any appropriate shape such as a trapezoidal shape, a circular shape, a diamond shape, or any other appropriate shape. In addition, the CTS 810 is described in relation to FIGS. 8A and 8B as the ends 813, 815 being received by the CMS 104. However, it will be appreciated, with the benefit of the present disclosure, that one or both of the ends 813, 815 may receive an end of the CMS 104 to connect the internal volume 109 of the CMS 104 and the volumes 820, 828 of the CTS 810. For example, the end 813 of the first segment 814 may receive the end of the CMS 104 and the end 815 of the second segment 822 may be received by the CMS 104. As another example, the end 813 of the first segment 814 may be received by the end of the CMS 104 and the end 815 of the second segment 822 may receive the end of the CMS 104. As yet another example, the end 813 of the first segment 814 may receive the end of the CMS 104 and the end 815 of the second segment 822 may receive another end of the CMS 104.

Figure 9:
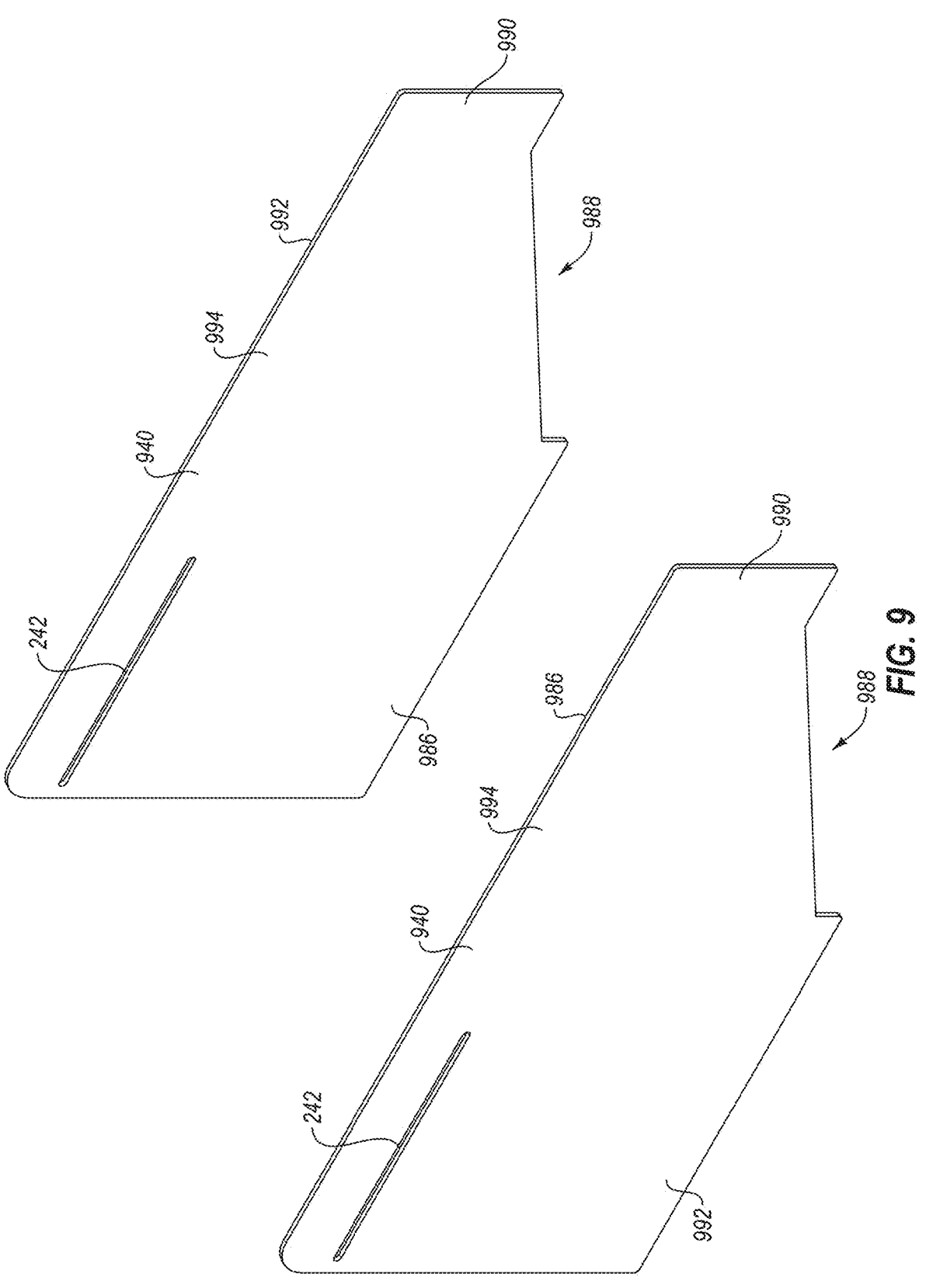
FIG. 9 illustrates a left perspective view of additional example side panels; all according to at least one embodiment described in the present disclosure.

With reference to FIG. 9, sloped double side panels 940 that may be implemented in place of the double side panels 840 of FIGS. 8A and 8B are shown. The sloped double side panels 940 may be similar or comparable to the side panels 840 of FIGS. 8A and 8B, although with a variation in cutouts 988 compared to the cutouts of the side panels 840. Each of the sloped side panels 940 may include an inner surface 986. The inner surfaces 986 may physically engage part of the outer surfaces of the sidewalls 816 of the first segment 814. In addition, the inner surfaces 986 may physically engage parts of the outer surfaces of the sidewalls 824 of the second segment 822.

Each of the sloped double side panels 940 may include a transition portion 994 that connects a body 992 to a protrusion portion 990. The protrusion portions 990 may extend from the transition portions 994 such that at least a portion of the protrusion portions 990 are positioned above the transition 112 when installed. In addition, the protrusion portions 990, the transition portions 994, and/or the bodies 992 may define the cutouts 988. The cutouts 988 may be configured to receive at least a portion of the transition 112. In some embodiments, a shape of the cutouts 988 may correspond to a shape of the transition 112. For example, as illustrated in FIG. 9, the cutouts 988 may include a sloped shape that may correspond to a sloped curb or a decorative curb.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A cable transition system comprising:
a first segment that at least partially defines a first volume extending along a first plane and configured to receive a cable; and
a second segment that at least partially defines a second volume extending along a second plane and configured to receive the cable, wherein:
the second plane is different than the first plane;
the second segment is configured to couple to the first segment to at least partially define an adjustable volume connected to the first volume and the second volume;
a position of the second segment relative to the first segment is adjustable to change a height of the adjustable volume; and
the adjustable volume is configured to route the cable between the first plane and the second plane.

2. The cable transition system of claim 1, wherein the first segment defines a slot configured to receive a part of a cable management system to position the first segment relative to the cable management system to connect an internal volume of the cable management system and the first volume.

3. The cable transition system of claim 1, wherein:
the first segment comprises a protrusion; and
the second segment defines a protrusion opening configured to receive the protrusion to position the second segment relative to the first segment.

4. The cable transition system of claim 3 further comprising a fastener configured to:
interface with the protrusion of the first segment via the protrusion opening; and draw at least a portion of the second segment towards at least a portion of the first segment to couple the second segment to the first segment.

5. The cable transition system of claim 3 further comprising a side panel comprising:
an inner surface configured to engage an outer surface of the first segment and an outer surface of the second segment to at least partially define the adjustable volume; and
a panel opening configured to receive the protrusion via the protrusion opening to position the side panel relative to the first segment and the second segment.

6. The cable transition system of claim 5 further comprising a fastener configured to:
interface with the protrusion via the protrusion opening and the panel opening; and
draw the side panel towards at least a portion of the first segment and at least a portion of the second segment to couple the side panel to the first segment and the second segment.

7. The cable transition system of claim 5, wherein:
the protrusion opening is sized and shaped to permit the position of the second segment relative to the first segment to be adjusted to change the height of the adjustable volume; and
the panel opening is sized and shape to permit the position of the side panel relative to the first segment and the second segment to be adjusted to:
change a depth of the adjustable volume; and
permit the side panel to interface with an obstacle proximate the first segment and the second segment.

8. The cable transition system of claim 1, wherein the second segment at least partially defines a segment opening that is sized and shaped to receive a part of the first segment.

9. The cable transition system of claim 1, wherein:
the first segment comprises a first sidewall comprising:
a first portion at least partially extending along the first plane;
a transition portion connected to the first portion; and
a second portion connected to the transition portion and at least partially defining the adjustable volume; and
the second segment comprises a second sidewall comprising:
a third portion at least partially extending along the second plane; and
a fourth portion connected to the third portion, the fourth portion at least partially defining a segment opening that is sized and shaped to receive the second portion of the first sidewall.

10. The cable transition system of claim 1, wherein:
the first segment at least partially defines a first opening on the first plane, the first opening configured to receive the cable on the first plane; and
the second segment at least partially defines a second opening on the second plane, the second opening configured to receive the cable on the second plane.

11. A system comprising:
a first cable management system extending along a first plane and defining a first volume;
a second cable management system extending along a second plane and defining a second volume; and
a cable transition system comprising:
a first segment coupled to the first cable management system, the first segment at least partially defining a third volume extending along the first plane and configured to receive a cable from the first cable management system on the first plane; and a second segment coupled to the second cable management system, the second segment at least partially defining a fourth volume extending along the second plane and configured to provide the cable to the second cable management system on the second plane, wherein:

the second plane is different than the first plane;

the second segment is configured to couple to the first segment to at least partially define an adjustable volume connected to the first volume and the second volume;

a position of the second segment relative to the first segment is adjustable to change a height of the adjustable volume; and the adjustable volume is configured to receive the cable on the first plane from the first volume and to provide the cable on the second plane to the second volume to route the cable between the first plane and the second plane.

12. The system of claim 11, wherein the first segment defines a slot configured to receive a part of the first cable management system to position the first segment relative to the first cable management system to connect the first volume and the third volume.

13. The system of claim 11, wherein:

the first segment comprises a protrusion; and the second segment defines a protrusion opening configured to receive the protrusion to position the second segment relative to the first segment.

14. The system of claim 13 further comprising a fastener configured to:

interface with the protrusion of the first segment via the protrusion opening; and draw at least a portion of the second segment towards at least a portion of the first segment to couple the second segment to the first segment.

15. The system of claim 13 further comprising a side panel comprising:

an inner surface configured to engage an outer surface of the first segment and an outer surface of the second segment to at least partially define the adjustable volume; and a panel opening configured to receive the protrusion via the protrusion opening to position the side panel relative to the first segment and the second segment.

16. The system of claim 15 further comprising a fastener configured to:

interface with the protrusion via the protrusion opening and the panel opening; and draw the side panel towards at least a portion of the first segment and at least a portion of the second segment to couple the side panel to the first segment and the second segment.

17. The system of claim 15, wherein:

the protrusion opening is sized and shaped to permit the position of the second segment relative to the first segment to be adjusted to change the height of the adjustable volume; and the panel opening is sized and shape to permit the position of the side panel relative to the first segment and the second segment to be adjusted to:

change a depth of the adjustable volume; and permit the side panel to interface with an obstacle proximate the first segment and the second segment.

18. The system of claim 11, wherein the second segment at least partially defines a segment opening that is sized and shaped to receive at least a part of the first segment.

19. The system of claim 11, wherein:

the first segment comprises a first sidewall comprising:

a first portion at least partially extending along the first plane;

a transition portion connected to the first portion; and a second portion connected to the transition portion and at least partially defining the adjustable volume; and the second segment comprises a third sidewall comprising:

a third portion at least partially extending along the second plane; and a fourth portion connected to the third portion, the fourth portion at least partially defining a segment opening that is sized and shaped to receive the second portion of the first sidewall.

20. The system of claim 11, wherein:

the first segment at least partially defines a first opening on the first plane, the first opening configured to receive the cable on the first plane from the first cable management system; and the second segment at least partially defines a second opening on the second plane, the second opening configured to provide the cable on the second plane to the second cable management system.

* * * * *